(12) United States Patent
Lassally (10) Patent No.: US 9,401,730 B2
(45) Date of Patent: Jul. 26, 2016

(54) TWO WAY RADIO AND PERIPHERAL DEVICES

(71) Applicant: Teodoro Lassally, Deland, FL (US)

(72) Inventor: Teodoro Lassally, Deland, FL (US)

(*) Notice: Subject to any disclaimer, the term of this patent is extended or adjusted under 35 U.S.C. 154(b) by 116 days.

(21) Appl. No.: 14/322,383

(22) Filed: Jul. 2, 2014

(65) Prior Publication Data

US 2014/0315502 A1    Oct. 23, 2014

Related U.S. Application Data

(63) Continuation of application No. 11/344,062, filed on Feb. 1, 2006, now Pat. No. 8,798,659.

(60) Provisional application No. 60/751,300, filed on Dec. 19, 2005.

(51) Int. Cl.
*H04B 7/00* (2006.01)
*H04B 1/00* (2006.01)
*H04B 1/44* (2006.01)
*H04B 1/3827* (2015.01)

(52) U.S. Cl.
CPC .............. *H04B 1/005* (2013.01); *H04B 1/3833* (2013.01); *H04B 1/44* (2013.01)

(58) Field of Classification Search
USPC ........................................................ 455/518
See application file for complete search history.

(56) References Cited

U.S. PATENT DOCUMENTS

| | | | | | |
|---|---|---|---|---|---|
| 4,775,999 A * | 10/1988 | Williams | .............. | H04W 36/14 | 340/7.27 |
| 5,953,671 A * | 9/1999 | Childress | .............. | H04W 84/08 | 455/512 |
| 6,041,243 A * | 3/2000 | Davidson | ............... | H04B 1/086 | 455/351 |
| 6,853,302 B2 * | 2/2005 | Monroe | ............. | G08B 21/0269 | 340/5.8 |
| 6,952,590 B2 * | 10/2005 | Legare | .............. | H04M 1/72513 | 455/421 |
| 2002/0006806 A1 * | 1/2002 | Kinnunen | ............ | H04B 1/3833 | 455/550.1 |
| 2002/0146987 A1 * | 10/2002 | Maden | ................... | H04B 1/385 | 455/553.1 |
| 2003/0092399 A1 * | 5/2003 | Davies | ................. | H04B 1/3827 | 455/88 |
| 2003/0114134 A1 | 6/2003 | Davies | | | |
| 2004/0242178 A1 * | 12/2004 | Kim | ....................... | H03D 7/145 | 455/234.1 |
| 2005/0054375 A1 * | 3/2005 | Patel | ....................... | H04W 4/10 | 455/552.1 |
| 2005/0143135 A1 * | 6/2005 | Brems | ................. | H04M 1/2745 | 455/564 |

* cited by examiner

*Primary Examiner* — Ankur Jain
(74) *Attorney, Agent, or Firm* — Kramer & Amado P.C.

(57) ABSTRACT

A two way radio includes a first push to talk button and a second push to talk button. The first push to talk button is configured to cause transmission of a first signal on a first channel. The second push to talk button is configured to cause transmission of a second signal on a second channel. The first and second channels are in a single radio network. A radio peripheral device for operation with a two-way radio includes a connector configured to be connected to the two-way radio; a speaker configured to output audio based on a received audio signal that is received from the two-way radio via the connector; a microphone; a first push-to-talk button configured to provide a first indication to the two-way radio; and a second push-to-talk button configured to provide a second indication to the two-way radio.

20 Claims, 12 Drawing Sheets

TWO WAY RADIO AND PERIPHERAL DEVICES

CROSS-REFERENCE TO RELATED APPLICATIONS

This application is a continuation of U.S. patent application Ser. No. 11/344,062, filed on Feb. 1, 2006, which claims priority to U.S. provisional application No. 60/751,300, filed on Dec. 19, 2005, the entire disclosures of which are hereby incorporated herein for all purposes.

BACKGROUND

Two way radios allow users the ability to wirelessly communicate with others on a small network. Most two way radios use various channels or frequencies for communication. Monitoring of more than one channel allows a user to communicate with a plurality of people for a variety of purposes. In a security environment, for instance, channel 1 may be used to communicate about and monitor emergency conditions. Channel 2 may be used to communicate about and monitor major security threats. Channel 3 may be used to communicate about and monitor minor security threats. A user may monitor all three channels by using a two way radio having a scanning mode. However, the user is limited to transmitting on the most recently scanned channel. If the use fails to transmit within a short predetermined period of time, the two way radio may have scanned to a new channel. The user then has to manually select the channel wasting time and eliminating the ability to scan other channels during the selection process.

What is needed is a two way radio that allows a user to listen to more than one channel and transmit on a selected channel or predetermined channel in a convenient manner.

SUMMARY

According to an embodiment, a two way radio includes a first push to talk button and a second push to talk button. The first push to talk button is configured to cause transmission of a first signal on a first channel. The second push to talk button is configured to cause transmission of a second signal on a second channel. The first and second channels are in a single radio network.

BRIEF DESCRIPTION OF THE DRAWINGS

Examples of the invention are illustrated, without limitation, in the accompanying figures in which like numeral references refer to like elements and wherein.

DETAILED DESCRIPTION

For simplicity and illustrative purposes, the principles are shown by way of examples of systems and methods described. In the following description, numerous specific details are set forth in order to provide a thorough understanding of the examples. It will be apparent however, to one of ordinary skill in the art, that the examples may be practiced without limitation to these specific details. In other instances, well known methods and structures are not described in detail so as not to unnecessarily obscure understanding of the examples.

In an example, a two way radio includes two push to talk buttons. A first push to talk button is configured to transmit a signal on a first channel while a second push to talk button is configured to transmit a signal on a second channel. Both the first and second channels may be located in the same radio network. In one example, the first push to talk button is assigned to a first channel while the second push to talk button is assigned to a second channel. A user may use the two way radio to listen to both channels simultaneously. That is, the user does not have to switch between the first and second channel to hear both channels. If the user wants to send a message on the first channel, the user presses the first push to talk button. If the user wants to send a message on the second channel, the user presses the second push to talk button. Additionally, the first or second channel may consist of a talk group or group of channels. This may be assigned by the user.

In another example, the two way radio includes two push to talk buttons and a selector for allowing a user to select a channel for use. A first push to talk button is configured to transmit a signal on a first channel while a second push to talk button is configured to transmit a signal on a second channel or group of channels. Both the first and second channels may be located in the same radio network. The user selects a channel to use and the first push to talk button is then assigned to the channel selected by the user. The second push to talk button is assigned to a second predetermined channel. A user may use the two way radio to listen to both channels simultaneously or alternatively to only the selected channel. If the user wants to send a message on the selected channel, the user presses the first push to talk button. If the user wants to send a message on the second channel, the user presses the second push to talk button.

In another example, the two way radio includes two push to talk buttons and a scanning model for allowing a user to scan through a list of channels. A first push to talk button is configured to transmit a signal on a first channel while a second push to talk button is configured to transmit a signal on a second channel or group of channels. Both the first and second channels may be located in the same radio network. The user puts the two way radio in scanning mode and listens to conversations in the channels as the radio scans through the list of channels. The first push to talk button is assigned to the most recently scanned or selected channel. This assignment continues to change as the channels are scanned. If the user wants to communicate on the most recently scanned or selected channel, the user pushes the first push to talk button. The second push to talk button may be assigned to a second predetermined channel. If the user wants to send a message on the most recently scanned channel, the user presses the first push to talk button. If the user wants to send a message on the second channel, the user presses the second push to talk button.

Figure 1:
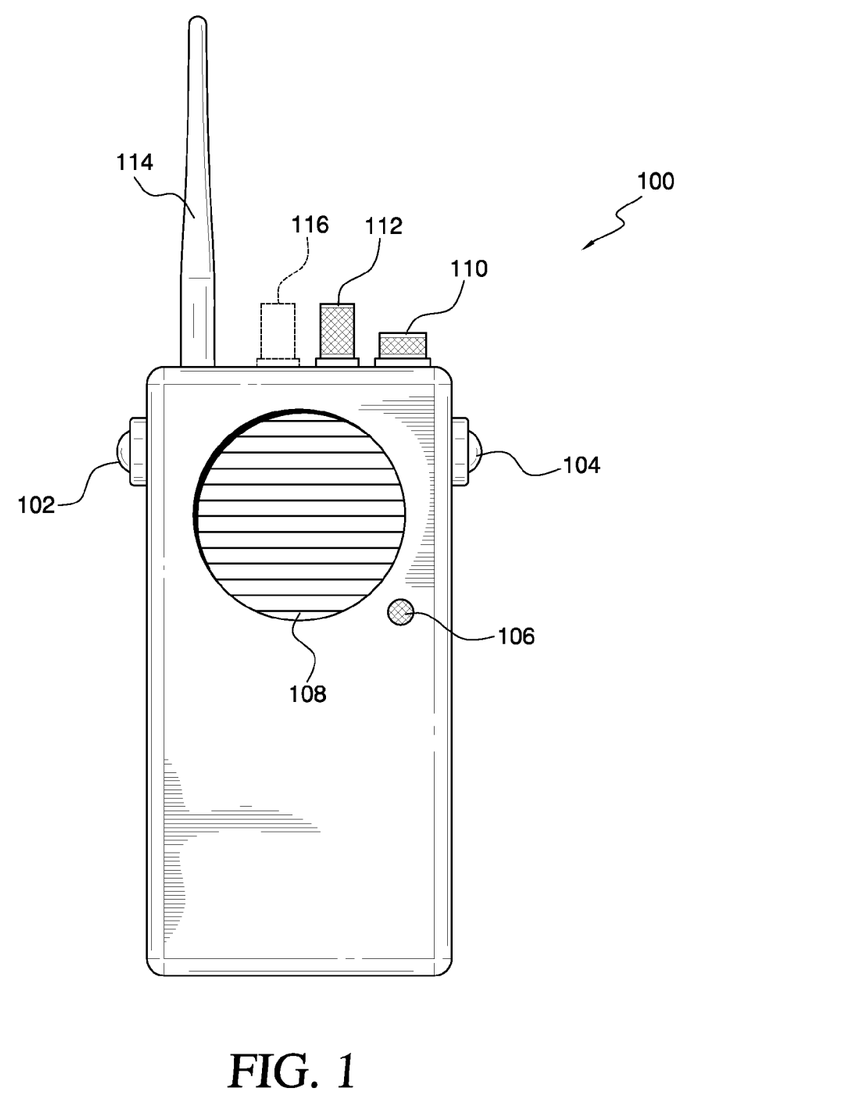
FIG. 1 shows an illustrated view of a two way radio in accordance with an embodiment of the invention.

With reference first to FIG. 1, there is shown a two way radio 100 including a first push to talk button 102 and a second push to talk button 104. The two way radio 100 also includes a microphone 106, a speaker, 108, a volume knob 110, a channel selector 112, and an antenna 114. The volume knob 110 may also act as the on/off switch for the two way radio 100 allowing a user to turn the two way radio 100 on and adjust the volume to the appropriate level. The user may adjust the channel selector 112 to select a channel to use. In one embodiment, the first push to talk button 102 operates to transmit a signal on the channel selected by the channel selector 112. The second push to talk button 104 operates to transmit a signal on another channel selected by the user. Assigning a channel to the second push to talk button 104 may be accomplished programmatically or through a series of switches. In another embodiment, a user may hold down the second push to talk button 104 and then select the channel to assign using the channel selector 112. Once the appropriate channel is selected, the user may release the second push to talk button 104.

In another embodiment, the channel selector 112 may include a plurality of selections wherein each selection is a channel or a job list. For example, if the channel selector 112 includes 16 selections there may be 16 possible channels for use. However, a subset of those selections may be reserved for job lists. A user may decide to program four configurations or job lists into the two way radio 100. In that case, 12 channels will be available for use and the remaining four selections will be assigned to setting the two way radio 100 to a predetermined configuration or job list.

A job list, as used herein, is a preprogrammed configuration for the two way radio 100. For example, if the user of the two way radio 100 has several scenarios for operating the radio, the use may program or have a technician program a job list into the two way radio 100. In one job list the first push to talk button 102 may be assigned to channel four while the second push to talk button 104 is assigned to channel eight. In another job list, the first push to talk button 102 may be assigned to channel three while the second push to talk button 104 is assigned to channel seven. The various possible scanning modes of the two way radio 100 may also be configured using job lists.

In another embodiment, the channel selection 112 may include a plurality of selections wherein each selection is a channel. In this embodiment, the two way radio 100 may be provided with a job list selector 116. In this manner, full use of the available channels is accessible through the channel selector 112. For instance, if the channel selector 112 includes 16 selections, then the 16 channels are usable. The job list selector 116 allows the user to separately select a particular configuration of the two way radio 100.

In another embodiment, the channel selector 112 may include a scanning mode selection. The scanning mode allows the user to listen to several channels from a list of channels. In this example, the first push to talk button 102 may be assigned to the most recently scanned channel. If the scanning mode scans channels 1, 2, 3, 7, and 9 then back to 1, then the first push to talk button 102 is assigned to channels 1, 2, 3, 7, and 9 and then back to 1 in that order. In this way, the first push to talk button 102 may be used to communicate on the channel most recently listened to by the user. As with the previous example, the second push to talk button 104 may be assigned to a predetermined channel.

In another embodiment, the first push to talk button 102 may be assigned to a first channel while the second push to talk button 104 may be assigned to a second channel. In this example, the use may scan channels or select specific channel for listening to various conversations. However, the first push to talk button 102 may be used to talk to a specific person or group no matter which channel the user is currently monitoring.

Figure 2:
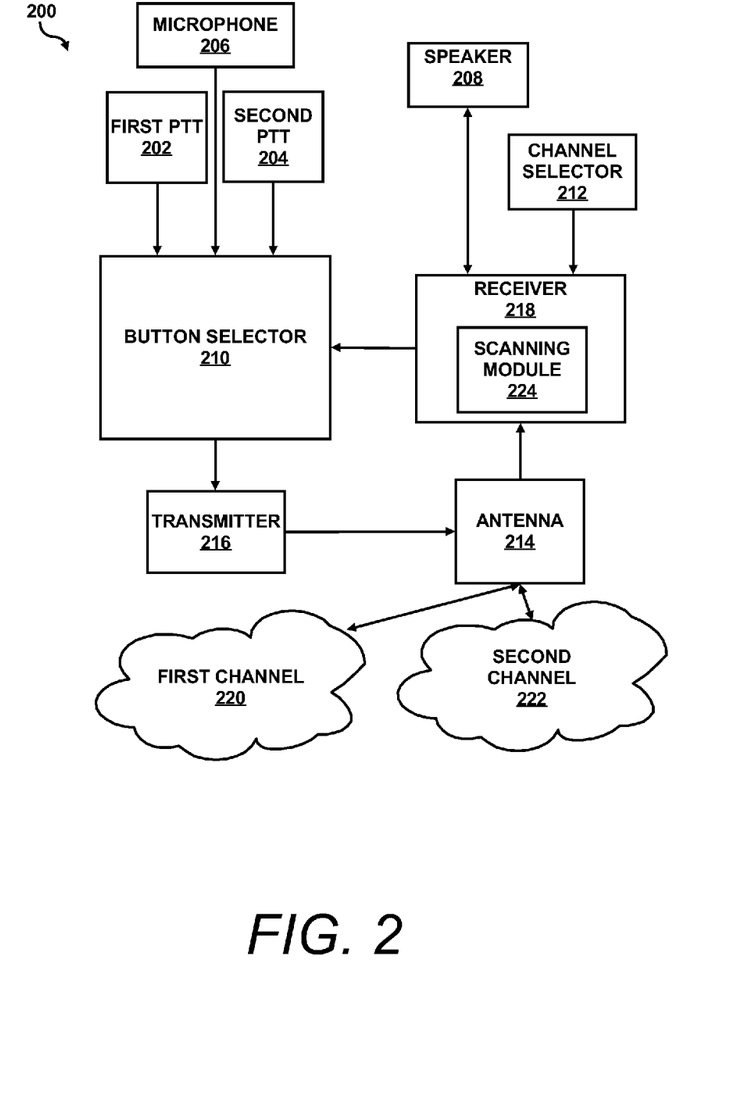
FIG. 2 shows a block diagram of a two way radio in accordance with an embodiment of the invention.

Referring now to FIG. 2, there is shown a block diagram of a two way radio 200 including a first push to talk button 202, a second push to talk button 204, a microphone 206, a speaker 208, a button selector 210, a channel selector 212, an antenna 214, a transmitter 216 and a receiver 218. FIG. 2 also illustrates a first channel 220 and a second channel 222.

A user may monitor a channel by selecting the channel using the channel selector 212. The channel selector 212 is connected to the receiver 218. The receiver 218 receives signals from the antenna 214 and decodes or demodulates the signals, processes the signals, and provides audio output through the speaker 208. The receiver 218 may monitor more than one frequency or channel at a time. Additionally, the receiver 218 may include a scanning module 224 for scanning through a list of predetermined frequencies. The receiver 218 may also provide input to the button selector 210 for various purposes described below.

The first push to talk button 202, the second push to talk button 204 and the microphone 206 may communicate through the button selector 210 to the transmitter 216. The button selector 210 determines which push to talk button 202 or 204 the user has selected and transmits the signals received from the microphone 206 to the transmitter 216. The transmitter 216 uses the antenna 214 for transmission of the signals on the first channel 220 or the second channel 222. In one example, the first push to talk button 202 is assigned to the first channel 220 while the second push to talk button is assigned to the second channel 222. The button selector 210 decodes signals created when the first or second push to talk buttons 202 or 204 are pressed to determined which button is selected. The button selector 210 then determines which channel is assigned to the selected button in order to determine which channel to use to transmit the signal. This determination may be made in a variety of manners. For instance, the button selector 210 may use a look up table or an algorithm to determine which channel is assigned to the selected button.

In another example, the first push to talk button 202 may be dynamically assigned depending on the state of the receiver 218. In this case, the receiver 218 provides input to the button selector 210 including the current channel being received. The first push to talk button 202 is then assigned to the current channel being received. The channel received may be the channel selected by the user through the channel selector 212. Alternatively, the channel received may be the channel currently being scanned by the scanning module 224 of the receiver 218.

Figure 3:
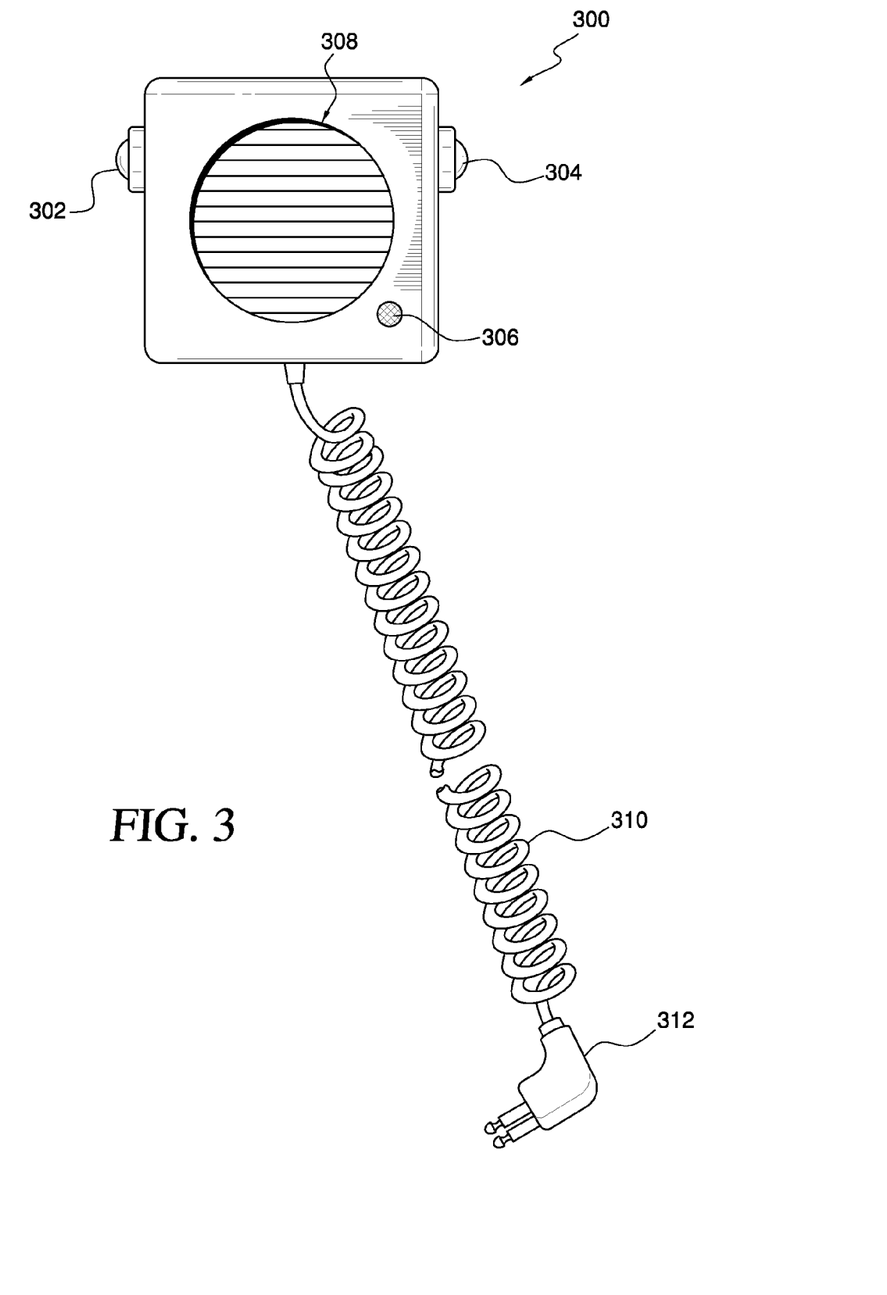
FIG. 3 shows an illustrated view of a speaker and microphone for use with a two way radio in accordance with an embodiment of the invention.

FIG. 3 shows an illustrated view of a handset 300 for use with a two way radio. The handset 300 includes a first push to talk button 302, a second push to talk button 304, a microphone 306, a speaker 308, and a cord 310 with a plug connector 312. The plug connector 312 plugs into a two way radio, such as the two radios described above, allowing a user to remotely operate the two way radio. For instance, a user may clip the two way radio to a belt and use the handset 300 for operating the radio. In one embodiment, the first push to talk button 302 operates to transmit a signal on the channel selected by the channel selector of the two way radio. The second push to talk button 304 operates to transmit a signal on another channel selected by the user. Assigning a channel to the second push to talk button 304 may be accomplished programmatically or through a series of switches. In another embodiment, a user may hold down the second push to talk button 304 and then select the channel to assign using the channel selector of the two way radio. Once the appropriate channel is selected, the user may release the second push to talk button 304.

In another embodiment, the two way radio may include a scanning mode. The scanning mode allows the user to listen to several channels from a list of channels. In this example, the first push to talk button 302 may be assigned to the most recently scanned channel. If the scanning mode scans channels 1, 2, 3, 7, and 9 then back to 1, then the first push to talk button 302 is assigned to channels 1, 2, 3, 7, and 9 and then back to 1 in that order. In this way, the first push to talk button 302 may be used to communicate on the channel most recently listened to by the user. As with the previous example, the second push to talk button 304 may be assigned to a predetermined channel.

In another embodiment, the first push to talk button 302 may be assigned to a first channel while the second push to talk button 304 may be assigned to a second channel. In this example, the use may scan channels or select specific channel for listening to various conversations. However, the first push to talk button 302 may be used to talk to a specific person or group no matter which channel the user is currently monitoring.

Figure 4:
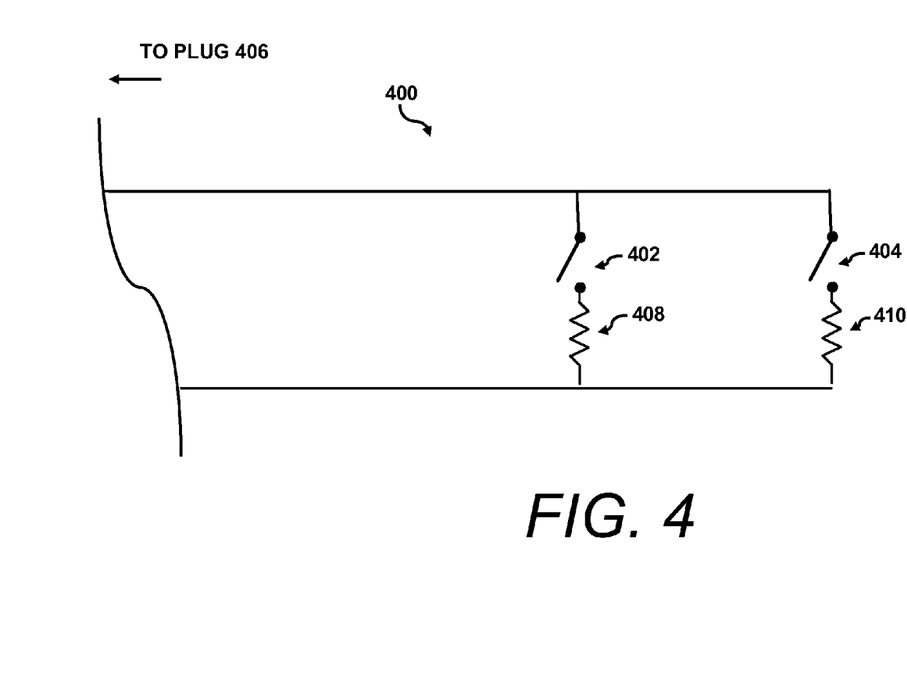
FIG. 4 shows a circuit diagram of a push to talk circuit in accordance with an embodiment of the invention.

FIG. 4 shows a circuit diagram of a push to talk circuit 400. In the self-contained two way radio examples disclosed in FIG. 2, the button selector 210 determines if the first push to talk button 202 or the second push to talk button 204 is pressed by the user. This determination may be made in a variety of well known manners. However, in the handset example shown in FIG. 3 and the headset example shown below in FIG. 5, only two wires connect two or more push to talk buttons to the button selector. Therefore, it is more difficult to determine which push to talk button is pressed. In FIG. 4, a first push to talk button 402 and a second push to talk button 404 are connected in parallel to the plug 406. A first resistor 408 is connected in series with the first push to talk button 402. A second resistor 410 is connected in series with the second push to talk button 404. The resistance of the first and second resistors 408 and 410 are different. Therefore, simply applying voltage to the plug and measure current through the circuit will allow the button selector to determine if the first or second push to talk buttons 402 or 404 is pressed. Alternatively, the two way radio or button selector may apply current to the plug and measure voltage in order to make a determination.

In an alternative embodiment, a headset or handset may include any number of push to talk buttons (with series resistors) in parallel. If each resistance value is different, the button selector or two way radio may easily determine which push to talk button is currently being activated by the user.

The circuit diagram depicted in FIG. 4 is simplified for purposes of clarity and explanation. Other circuit elements including a microphone element may be included in the circuit.

Figure 5:
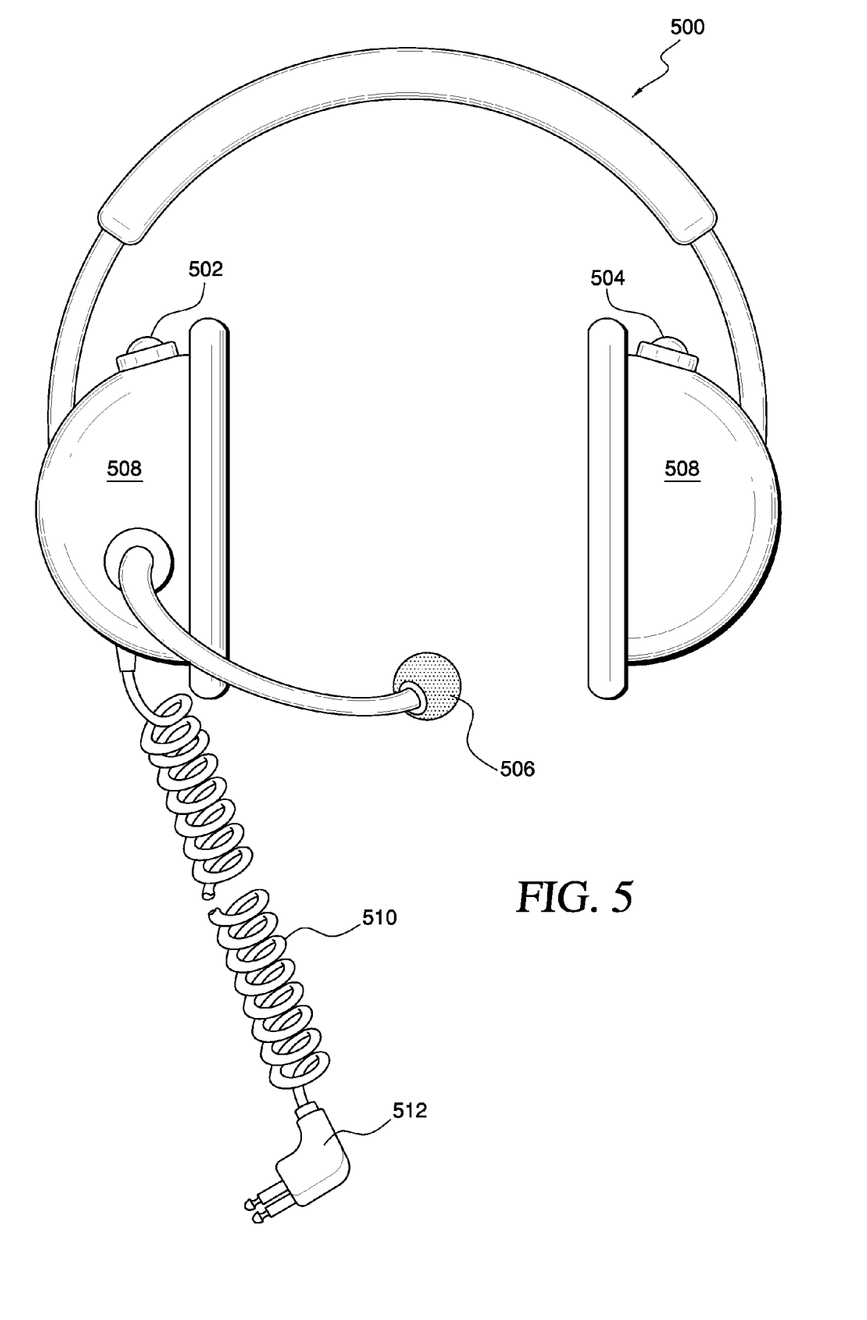
FIG. 5 shows an illustrated view of a headset for use with a two way radio in accordance with an embodiment of the invention.

FIG. 5 shows an illustrated view of a headset 500 for use with a two way radio. The handset 500 includes a first push to talk button 502, a second push to talk button 504, a microphone 506, ear cups 508, and a cord 510 with a plug connector 512. The plug connector 512 plugs into a two way radio, such as the two radios described above, allowing a user to remotely operate the two way radio. For instance, a user may clip the two way radio to a belt and wear the headset 500 for operating the radio. In one embodiment, the first push to talk button 502 operates to transmit a signal on the channel selected by the channel selector of the two way radio. The second push to talk button 504 operates to transmit a signal on another channel selected by the user. Assigning a channel to the second push to talk button 504 may be accomplished programmatically or through a series of switches. In another embodiment, a user may hold down the second push to talk button 504 and then select the channel to assign using the channel selector of the two way radio. Once the appropriate channel is selected, the user may release the second push to talk button 504.

In another embodiment, the two way radio may include a scanning mode. The scanning mode allows the user to listen to several channels from a list of channels. In this example, the first push to talk button 502 may be assigned to the most recently scanned channel. If the scanning mode scans channels 1, 2, 3, 7, and 9 then back to 1, then the first push to talk button 502 is assigned to channels 1, 2, 3, 7, and 9 and then back to 1 in that order. In this way, the first push to talk button 502 may be used to communicate on the channel most recently listened to by the user. As with the previous example, the second push to talk button 504 may be assigned to a predetermined channel.

In another embodiment, the first push to talk button 502 may be assigned to a first channel while the second push to talk button 504 may be assigned to a second channel. In this example, the use may scan channels or select specific channel for listening to various conversations. However, the first push to talk button 502 may be used to talk to a specific person or group no matter which channel the user is currently monitoring.

Figure 6:
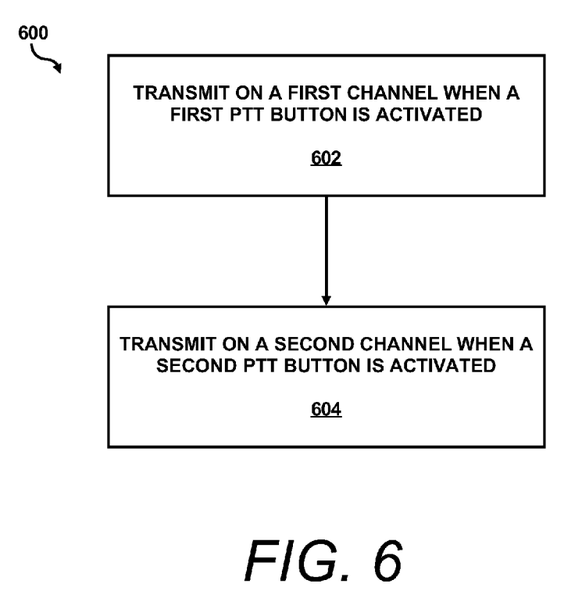
FIG. 6 shows a flow diagram of a method for operating a two way radio in accordance with an embodiment of the invention.

FIG. 6 shows a flow diagram of a method 600 for using the two way radio 200. The following description of the method 600 is made with reference to the two way radio 200 illustrated in FIG. 2, and thus makes reference to the elements cited therein. The following description of the method 600 is one manner in which the two way radio 200 may be used. In this respect, it is to be understood that the following description of the method 600 is but one manner of a variety of different manners in which such a two way radio may be used.

In the method 600, the two way radio 200 transmits a first signal on the first channel 220 when the first push to talk button 202 is pressed at step 602. The two way radio 200 then transmits a second signal on the second channel 222 when the second push to talk button 204 is pressed at step 604. The first and second channels 220 and 222 are located in a single radio network.

Figure 7:
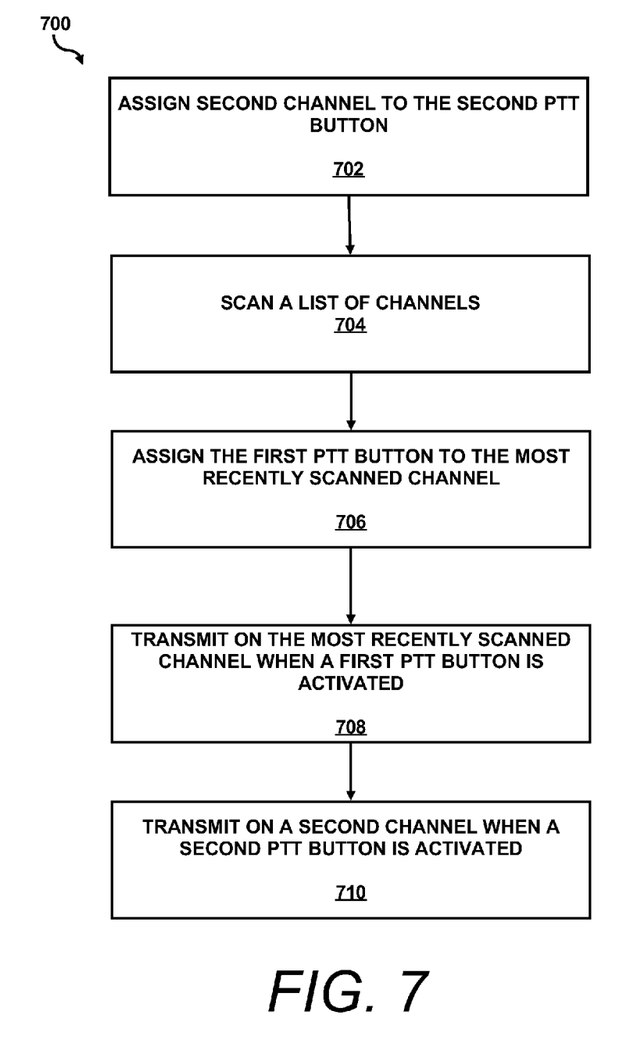
FIG. 7 shows a flow diagram of a method for operating a two way radio in accordance with another embodiment of the invention.

FIG. 7 shows a flow diagram of a method 700 for using the two way radio 200. The following description of the method 700 is made with reference to the two way radio 200 illustrated in FIG. 2, and thus makes reference to the elements cited therein. The following description of the method 700 is one manner in which the two way radio 200 may be used. In this respect, it is to be understood that the following description of the method 700 is but one manner of a variety of different manners in which such a two way radio may be used.

In the method 700, the second push to talk button 204 is assigned to the second channel 222 at step 702. The two way radio 200 then scans channels in a list of channels at step 704. As the channels are scanned, the first push to talk button 202 is dynamically assigned to the most recently scanned channel at step 706. Activating the first push to talk button 202 causes the two way radio 200 to transmit on the most recently scanned channel at step 708. Activating the second push to talk button 204 causes the two way radio 200 to transmit on the second channel 222 at step 710. In this embodiment, the second push to talk button 204 is used to talk on the second channel while the first push to talk button 202 is used to talk on the most recently scanned channel.

Figure 8:
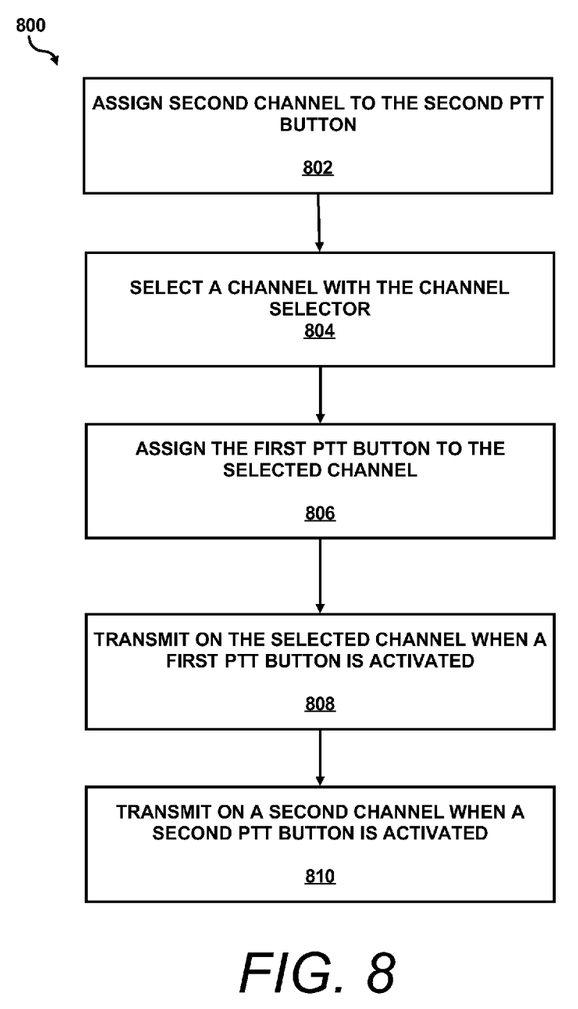
FIG. 8 shows a flow diagram of a method for operating a two way radio in accordance with another embodiment of the invention.

FIG. 8 shows a flow diagram of a method 800 for using the two way radio 200. The following description of the method 800 is made with reference to the two way radio 200 illustrated in FIG. 2, and thus makes reference to the elements cited therein. The following description of the method 800 is one manner in which the two way radio 200 may be used. In this respect, it is to be understood that the following description of the method 800 is but one manner of a variety of different manners in which such a two way radio may be used.

In the method 800, the second push to talk button 204 is assigned to the second channel 222 at step 802. A channel is selected on the two way radio 200 using the channel selector 212 at step 804. Then, the first push to talk button 202 is assigned to the selected channel at step 806. Activating the first push to talk button 202 causes the two way radio 200 to transmit on the selected channel at step 808. Activating the second push to talk button 204 causes the two way radio 200 to transmit on the second channel 222 at step 810. In this embodiment, the second push to talk button 204 is used to talk on the second channel while the first push to talk button 202 is used to talk on the channel selected by the channel selector 212. Adjusting the channel selector 212 changes the assignment of the first push to talk button 202 but not the second push to talk button 204.

Figure 9:
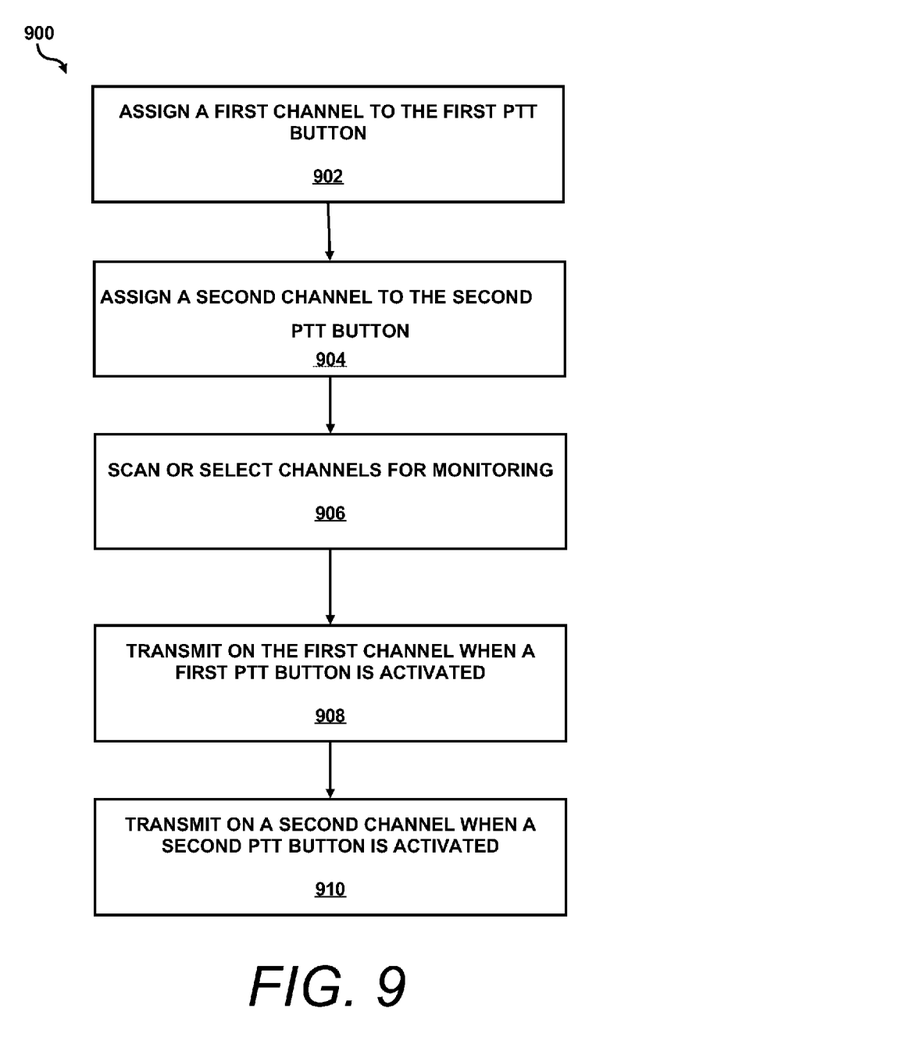
FIG. 9 shows a flow diagram of a method for operating a two way radio in accordance with another embodiment of the invention.

FIG. 9 shows a flow diagram of a method 900 for using the two way radio 200. The following description of the method 900 is made with reference to the two way radio 200 illustrated in FIG. 2, and thus makes reference to the elements cited therein. The following description of the method 900 is one manner in which the two way radio 200 may be used. In this respect, it is to be understood that the following description of the method 900 is but one manner of a variety of different manners in which such a two way radio may be used.

In the method 900, the first push to talk button 202 is assigned to the first channel 220 at step 802. The second push to talk button 204 is assigned to the second channel 222 at step 804. A user may then scan or select various channels for monitoring at step 806. Activating the first push to talk button 202 causes the two way radio 200 to transmit on the first channel 220 at step 808. Activating the second push to talk button 204 causes the two way radio 200 to transmit on the second channel 222 at step 810. In this embodiment, the second push to talk button 204 is used to talk on the second channel while the first push to talk button 202 is used to talk on the first channel 220. Adjusting the channel selector 212 or scanning channels does not change the assignment of either the first push to talk button 202 or the second push to talk button 204.

Figure 10:
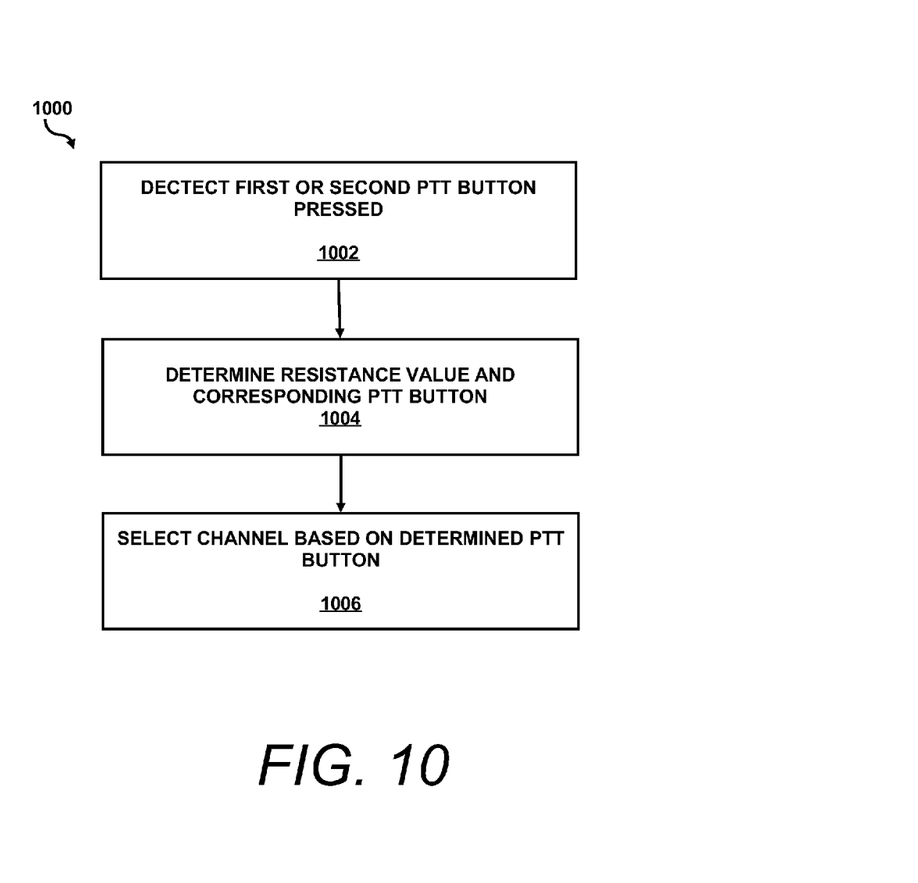
FIG. 10 shows a flow diagram of a method for operating a two way radio in accordance with another embodiment of the invention.

FIG. 10 shows a flow diagram of a method 1000 for detecting which push to talk button is depressed using the two way radio 200. The following description of the method 1000 is made with reference to the two way radio 200 illustrated in FIG. 2 and the circuit diagram illustrated in FIG. 4, and thus makes reference to the elements cited therein. The following description of the method 1000 is one manner in which the two way radio 200 may be used. In this respect, it is to be understood that the following description of the method 1000 is but one manner of a variety of different manners in which such a two way radio may be used.

In the method 1000, the two way radio 200 or the button selector 210 detects that either the first or second push to talk buttons 402 or 404 have been pressed at step 1002. The button selector 210 then measure the resistance value of the first or second resistor 408 or 410 at step 1004. This may be accomplished by applying a known voltage and measuring current or alternatively by applying a known current and measuring voltage. Once the resistance is known, the button selector 210 selects the channel currently assigned to either the first or second push to talk buttons 402 or 404 at step 1006.

Figure 11:
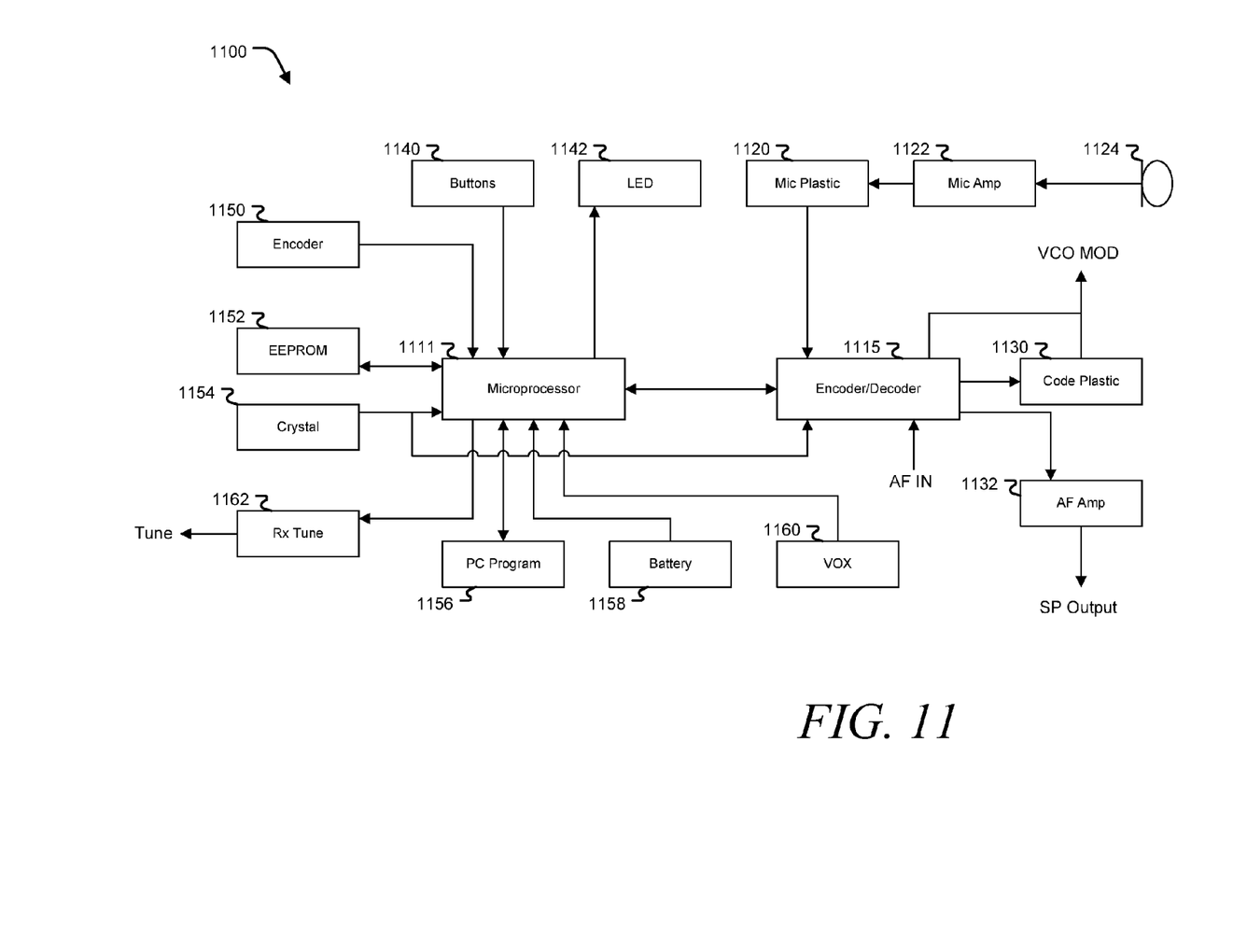
FIG. 11 shows an exemplary block diagram for implementing a portion of a two-way radio according to some embodiments.

FIG. 11 shows an exemplary block diagram 1100 for implementing a portion of a two-way radio according to some embodiments. As shown, the diagram 1111 includes a microprocessor in two-way communication with an encoder/decoder 1115. The encoder/decoder 1115 may be, for example, an FX828D5 microcircuit. The block diagram 1100 also includes a microphone 1124 that provides a sensed signal to a microphone amplifier 1122 which, in turn, outputs to a microphone plastic integrated circuit (IC) 1120. The microphone plastic IC 1120 outputs to the encoder/decoder 1115.

The encoder/decoder 1115 also outputs to a code plastic IC 1130, both of which output modulation values to a voltage controlled oscillator. The encoder/decoder 1115 also outputs to an audio frequency (AF) amplifier 1132. Both the microprocessor 1111 and encoder/decoder 1115 receive a signal from a crystal 1154 such as, for example, a 4.032 MHz pulse.

The microprocessor 1111 receives input from buttons 1140 which may be push-to-talk buttons, and outputs to one or more LED 1142. The microprocessor 1111 is also in communication with an EEPROM 1152, PC program 1156, battery 1158, and VOX 1160. The microprocessor 1111 also outputs to an Rx tuner 1162 for tuning a receiver circuit.

Figure 12:
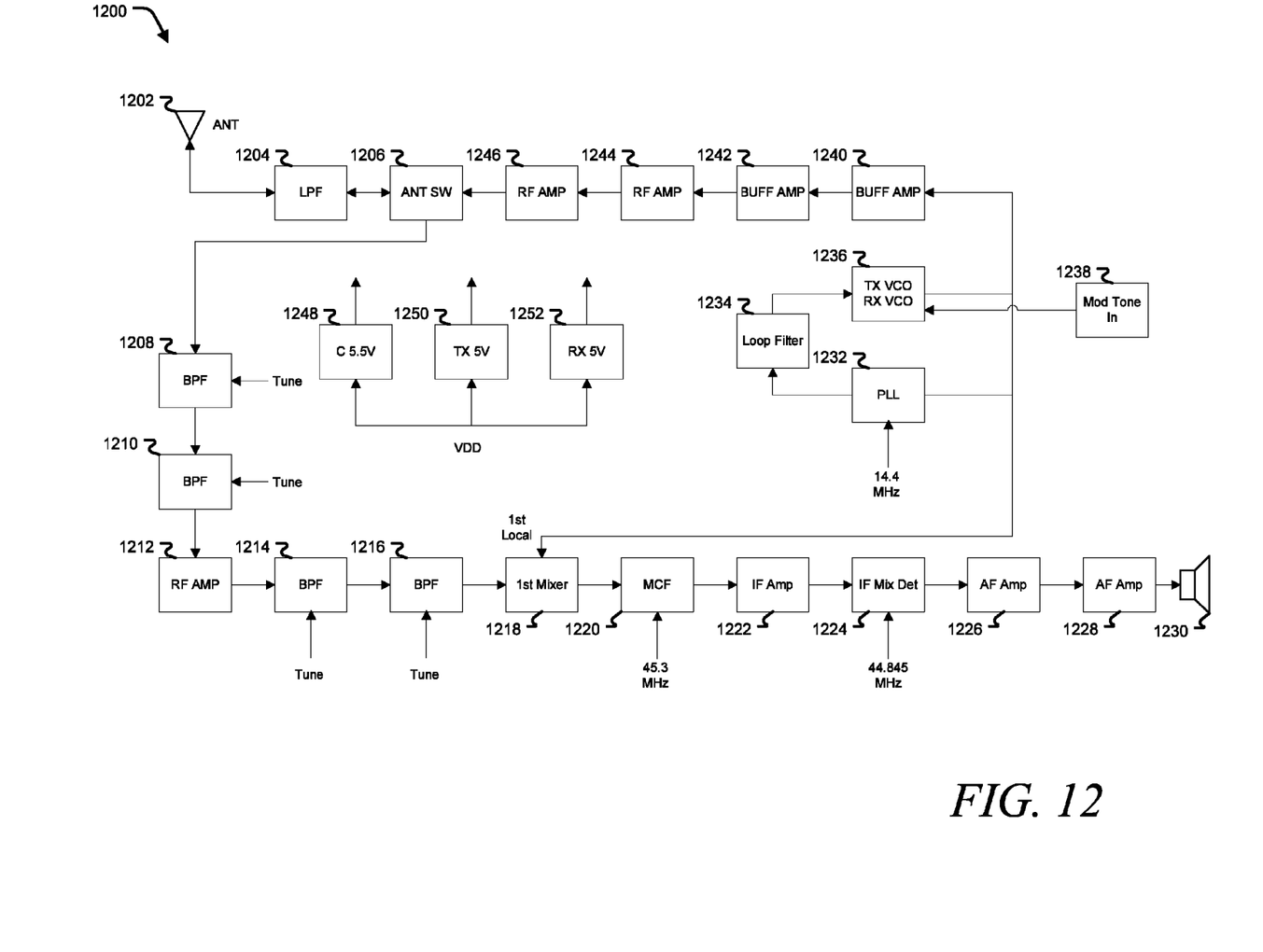
FIG. 12 shows an exemplary block diagram for implementing a portion of a two-way radio according to some embodiments.

FIG. 12 shows an exemplary block diagram 1200 for implementing a portion of a two-way radio according to some embodiments. As shown, the block diagram includes an antenna 1202 connected to a low pass filter 1204, which is connected to an antenna switch 126 that switches between a receive path and a transmit path.

The receive path includes two tunable band pass filters 1208, 1210, followed by a radio frequency amplifier 1212, followed by two additional tunable band pass filters 1214, 1216. The receive path then enters a first mixer 1218, which outputs a mixed signal to a monolithic crystal filter (MCF) 1220, amplifier 1222, mixer 1224, two AF amplifiers 1226, 1228, and finally output through a speaker 1230.

A phase-locked loop (PLL) 1232 outputs a signal to a loop filter 1234, which then outputs a signal to transmission and reception voltage controller oscillators (VCOs) 1236. The transmission and reception VCOs 126 also receive a modulation tone 1238 and output a signal to both the first mixer 1218 and the transmit path. On the transmit path, the outgoing signal traverses two buffer amplifiers 1240, 1242, and two radio frequency amplifiers 1244, 1246, before arriving at the antenna switch 1206. The diagram also includes a power manager including voltage regulators 1248, 1250, 1252 for providing 5.5V, 5V transmission, and 5V reception power sources, respectively.

What has been described and illustrated herein are examples of the systems and methods described herein along with some of their variations. The terms, descriptions and

What is claimed is:

1. A radio peripheral device for operation with a two-way radio, the peripheral device comprising:
   a connector configured to be connected to the two-way radio;
   a speaker configured to output audio based on a received audio signal that is received from the two-way radio via the connector;
   a microphone;
   a first push-to-talk button configured to provide a first indication to the two-way radio; and
   a second push-to-talk button configured to provide a second indication to the two-way radio,
   wherein the first push-to-talk button corresponds to a first channel and a first measured resistance value, and
   wherein the second push-to-talk button corresponds to a second channel and a second measured resistance value.

2. The radio peripheral device of claim 1, wherein:
   in providing the first indication to the two-way radio, the first push-to-talk button is configured to provide at a first current to the two-way radio in response to the two-way radio providing a first voltage to the connector and when the first push-to-talk button is pressed, and
   in providing the second indication to the two-way radio, the second push-to-talk button is configured to provide at a second current to the two-way radio in response to the two-way radio providing the first voltage to the connector and when the second push-to-talk button is pressed, wherein the first current is different from the second current.

3. The radio peripheral device of claim 1, further comprising:
   a first switch arranged in series with a first resistor having a first resistance,
   a second switch arranged in series with a second resistor having a second resistance that is different from the first resistance, wherein:
      the first push-to-talk button is in operative engagement with the first switch,
      the second push-to-talk button is in operative engagement with the second switch, and
      the first switch and the first resistor are arranged parallel to the second switch and second resistor.

4. The radio peripheral device of claim 1, wherein:
   the first indication includes a first audio signal received by the microphone; and
   the second indication includes a second audio signal received by the microphone.

5. A radio system comprising:
   the radio peripheral device of claim 1; and
   the two-way radio, wherein the two-way radio comprises:
      an antenna configured to communicate via a wireless communications medium over a first channel and a second channel,
      a button selector configured to receive the first indication and the second indication via the connector of the radio peripheral device, and
      a transmitter configured to:
         transmit a user audio signal received by the microphone via the antenna over the first channel based in the button selector receiving the first indication, and
         transmit the user audio signal received by the microphone via the antenna over the second channel based in the button selector receiving the second indication.

6. The radio system of claim 5, wherein:
   the button selector is configured to:
      apply at least one of an applied voltage and an applied current to the connector, and
      measure at least one of a measured voltage and a measured current received from the connector, wherein the first indication and the second indication are respective values of the at least one of the measured voltage and the measured current.

7. A radio headset device for operation with a two-way radio, the headset device comprising:
   a connector configured to be connected to the two-way radio;
   a pair of speakers comprising a left ear speaker and a right ear speaker arranged to be held against respective ears of a wearer, wherein the pair of speakers are configured to output audio based on a received audio signal that is received from the two-way radio via the connector;
   an arm-mounted microphone;
   a first push-to-talk button configured to provide a first indication to the two-way radio; and
   a second push-to-talk button configured to provide a second indication to the two-way radio,
   wherein the first push-to-talk button corresponds to a first channel and a first measured resistance value, and
   wherein the second push-to-talk button corresponds to a second channel and a second measured resistance value.

8. The radio headset device of claim 7, wherein:
   in providing the first indication to the two-way radio, the first push-to-talk button is configured to provide at a first current to the two-way radio in response to the two-way radio providing a first voltage to the connector and when the first push-to-talk button is pressed, and
   in providing the second indication to the two-way radio, the second push-to-talk button is configured to provide at a second current to the two-way radio in response to the two-way radio providing the first voltage to the connector and when the second push-to-talk button is pressed, wherein the first current is different from the second current.

9. The radio headset device of claim 7, wherein:
   a first switch arranged in series with a first resistor having a first resistance,
   a second switch arranged in series with a second resistor having a second resistance that is different from the first resistance, wherein:
      the first push-to-talk button is in operative engagement with the first switch,
      the second push-to-talk button is in operative engagement with the second switch, and
      the first switch and the first resistor are arranged parallel to the second switch and second resistor.

10. The radio headset device of claim 7, wherein:
    the first indication includes a first audio signal received by the microphone; and
    the second indication includes a second audio signal received by the microphone.

11. The radio headset device of claim 7, wherein:
the first push-to-talk button is located on a left ear housing that holds the left ear speaker, and
the second push-to-talk button is located on a right ear housing that holds the right ear speaker.

12. A radio system comprising:
the radio headset device of claim 7; and
the two-way radio, wherein the two-way radio comprises:
  an antenna configured to communicate via a wireless communications medium over a first channel and a second channel,
  a button selector configured to receive the first indication and the second indication via the connector of the radio headset device, and
  a transmitter configured to:
    transmit a user audio signal received by the microphone via the antenna over the first channel based in the button selector receiving the first indication, and
    transmit the user audio signal received by the microphone via the antenna over the second channel based in the button selector receiving the second indication.

13. The radio system of claim 12, wherein:
the button selector is configured to:
  apply at least one of an applied voltage and an applied current to the connector, and
  measure at least one of a measured voltage and a measured current received from the connector, wherein the first indication and the second indication are respective values of the at least one of the measured voltage and the measured current.

14. A radio headset device for operation with a two-way radio, the headset device comprising:
a connector configured to be connected to the two-way radio;
a handheld housing comprising:
  a speaker facing a first direction with respect to the housing, wherein the speaker is configured to output audio based on a received audio signal that is received from the two-way radio via the connector;
  an microphone facing the first direction;
  a first push-to-talk button configured to provide a first indication to the two-way radio; and
  a second push-to-talk button configured to provide a second indication to the two-way radio; and
a cord extending between the handheld housing and the connector,
wherein the first push-to-talk button corresponds to a first channel and a first measured resistance value, and
wherein the second push-to-talk button corresponds to a second channel and a second measured resistance value.

15. The radio handset device of claim 14, wherein:
in providing the first indication to the two-way radio, the first push-to-talk button is configured to provide at a first current to the two-way radio in response to the two-way radio providing a first voltage to the connector and when the first push-to-talk button is pressed, and
in providing the second indication to the two-way radio, the second push-to-talk button is configured to provide at a second current to the two-way radio in response to the two-way radio providing the first voltage to the connector and when the second push-to-talk button is pressed, wherein the first current is different from the second current.

16. The radio handset device of claim 14, wherein:
a first switch arranged in series with a first resistor having a first resistance,
a second switch arranged in series with a second resistor having a second resistance that is different from the first resistance, wherein:
  the first push-to-talk button is in operative engagement with the first switch,
  the second push-to-talk button is in operative engagement with the second switch, and
  the first switch and the first resistor are arranged parallel to the second switch and second resistor.

17. The radio handset device of claim 14, wherein:
the first indication includes a first audio signal received by the microphone; and
the second indication includes a second audio signal received by the microphone.

18. The radio handset device of claim 14, wherein:
a front side of the housing comprises at least one aperture aligned with the speaker and the microphone,
the first push-to-talk button is mounted on a left side of the housing, and
the second push-to-talk button is mounted on a right side of the housing which is opposite the left side of the housing.

19. A radio system comprising:
the radio handset device of claim 14; and
the two-way radio, wherein the two-way radio comprises:
  an antenna configured to communicate via a wireless communications medium over a first channel and a second channel,
  a button selector configured to receive the first indication and the second indication via the connector of the radio handset device, and
  a transmitter configured to:
    transmit a user audio signal received by the microphone via the antenna over the first channel based in the button selector receiving the first indication, and
    transmit the user audio signal received by the microphone via the antenna over the second channel based in the button selector receiving the second indication.

20. The radio system of claim 19, wherein:
the button selector is configured to:
  apply at least one of an applied voltage and an applied current to the connector, and
  measure at least one of a measured voltage and a measured current received from the connector, wherein the first indication and the second indication are respective values of the at least one of the measured voltage and the measured current.

* * * * *